United States Patent [19]

Schmitz

[11] 4,245,177
[45] Jan. 13, 1981

[54] INVERTER FOR OPERATING A GASEOUS DISCHARGE LAMP

[75] Inventor: Nicholas A. Schmitz, Liverpool, N.Y.

[73] Assignee: General Electric Company, Syracuse, N.Y.

[21] Appl. No.: 974,351

[22] Filed: Dec. 29, 1978

[51] Int. Cl.³ .................. H05B 37/00; H05B 39/00; H05B 41/14
[52] U.S. Cl. ................... 315/205; 315/DIG. 2; 315/DIG. 5; 315/DIG. 7; 315/239; 315/209 R; 331/113 A
[58] Field of Search ............ 331/113 A; 315/DIG. 2, 315/DIG. 5, DIG. 7, 205, 209, 239

[56] References Cited
U.S. PATENT DOCUMENTS

| | | | |
|---|---|---|---|
| 4,002,999 | 1/1977 | Hesler et al. | 331/113 A |
| 4,060,751 | 11/1977 | Anderson | 331/113 A |
| 4,127,798 | 11/1978 | Anderson | 331/113 A |

Primary Examiner—Saxfield Chatmon, Jr.
Attorney, Agent, or Firm—Richard V. Lang; Carl W. Baker

[57] ABSTRACT

A dc to ac inverter for operating a gaseous discharge lamp through pre-ignition, arc stabilization, warm-up and final run states is disclosed. The arrangement comprises a transformer and a pair of transistors connected for alternate conduction in a self-oscillating configuration in which turn off occurs at a predetermined flux level in each conduction period. The flux limit is used to preclude excess current drain during warm-up when the lamp resistance is at a minimum. A capacitor is provided, resonant at a harmonic of the inverter output waveform for producing the enhanced output voltage required for pre-ignition. The capacitor also helps to maintain a higher harmonic content during warm-up, enhancing the effective ballasting reactance during that period in relation to that during final run operation. A shift of the oscillating frequency of the inverter from pre-ignition to final run operation further enhances inverter operation.

6 Claims, 11 Drawing Figures

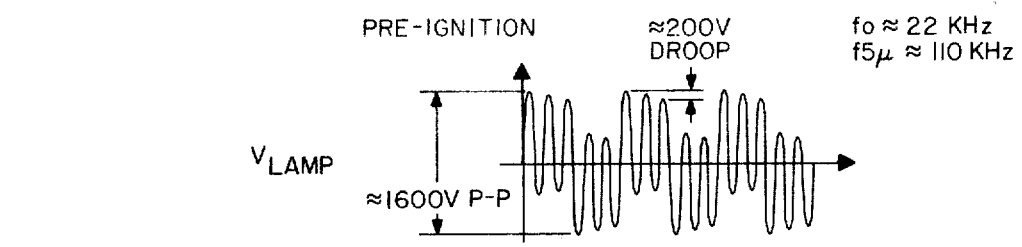
FIG. 5A
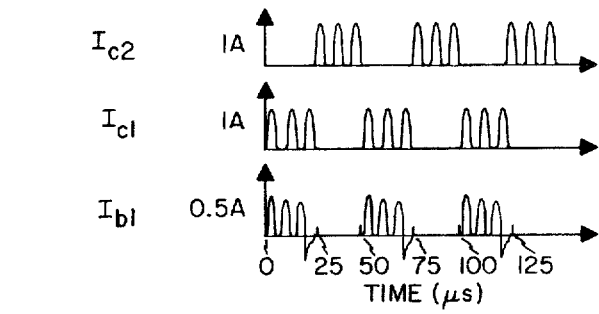
FIG. 5B
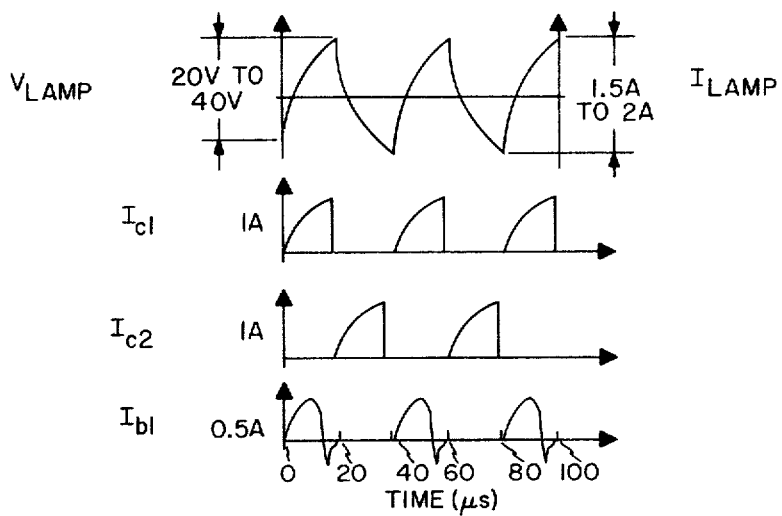
FIG. 5C
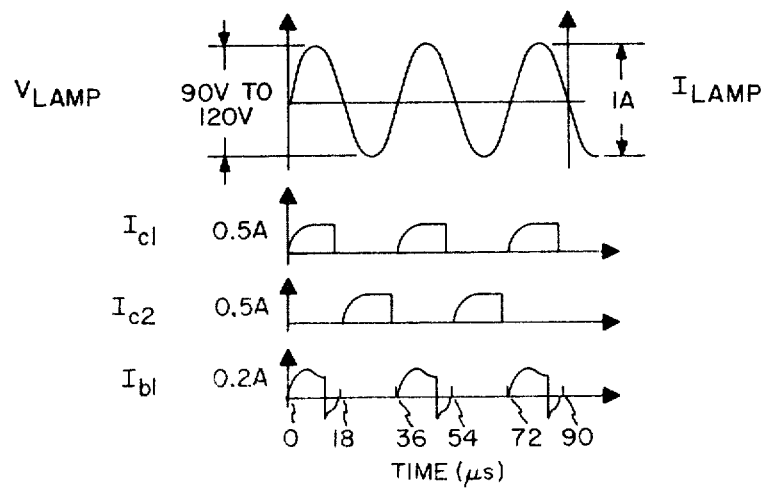

4,245,177

INVERTER FOR OPERATING A GASEOUS DISCHARGE LAMP

BACKGROUND OF THE INVENTION

1. Field of the Invention

The present invention relates to a static inverter. Static inverters are devices in which electrical energy is converted to electrical energy in another form through static or non-moving parts. In static inverters to which the present invention pertains, dc energy is converted to ac energy. The principal elements of such an inverter are an inductive means through which current is passed intermittently, and one or two electronic switches, typically transistors.

The invention has further application to the ballasting of gas discharge light sources in which a very high ignition voltage is required, current limiting is required during early warm-up, when the voltage is minimum, and ballasting is required during final run operation for stability.

2. Description of the Prior Art

Static inverters have been described in the U.S. Pat. Nos. 3,914,080; 4,002,999 of Hesler et al, and in the more recently filed applications of Peil, Ser. No. 875,337 (now refiled in a continuation-in-part as Ser. No. 028,405) and Ser. No. 909,300, all of which are assigned to the Assignee of the present application.

In the application Ser. No. 909,300, an inverter is disclosed employing a single blocking oscillator for operating a gas discharge lamp. An ignition pulse is provided by a separate circuit comprising an SCR switch. It is preferrable to achieve both the ignition and operating functions from a single circuit.

SUMMARY OF THE INVENTION

Accordingly, it is an object of the present invention to provide an improved static inverter for operation of a gas discharge lamp.

It is a further object of the present invention to provide an improved static inverter for providing pre-ignition potentials, current regulation during warm-up, and an appropriate ballast reactance for the final run states of a gas discharge lamp.

It is a further object of the invention to provide an improved inverter for operating a gaseous discharge lamp whose output is responsive to the state of the lamp.

It is still another object of the invention to provide an improved inverter whose output voltage is appropriately high during the pre-ignition state of the lamp and appropriately lower during other states of the lamp.

It is still another object of the invention to provide an improved inverter for operating a gaseous discharge lamp in which the effective ballasting reactance of the inverter is larger during warm-up than during final run operation.

These and other objects of the invention are achieved in a dc to ac inverter for operating a gaseous discharge lamp through pre-ignition, arc stabilization, warm-up and final run states.

The inverter input terminals are connected to a dc source and the output terminals are connected to the discharge lamp. The inverter comprises a transformer including a core, a main input winding and a main output winding loosely coupled to the input winding, and a control winding which produces an output which reverses in sense at a predetermined flux level in the core. The transformer exhibits an equivalent inductance suitable for ballasting the lamp at the voltage and current level required for the final run state.

The inverter also includes one or two electronic switches, typically transistors, serially coupled with the input winding across the dc source for producing a periodic output in the main output winding with substantial harmonic content. The switches are responsive to the control winding to limit the average current supplied to said light source during warm-up, precluding excessive power dissipation during the warm-up state of the lamp.

Capacitive means are further provided connected in shunt with the output winding and across the output terminals to resonate with the equivalent inductance at a prescribed harmonic, typically the 5th, to produce the enhanced output voltage required for pre-ignition and arc stabilization.

When the inverter is connected to a gaseous discharge lamp, the circuit "Q", and in consequence the output voltage, are dependent on the state of the lamp. The inverter parameters are selected for generating a maximum "Q" enhanced output voltage (e.g. 1600 volts peak to peak) during pre-ignition, the maximum output voltage re-appearing during arc-stabilization should the arc falter in the light source.

The inverter waveform is also dependent on the state of the lamp. The inverter generates substantial harmonic content during the pre-ignition, arc stabilization and warm-up states of the lamp, with the content falling in successive states. In each of these states, the harmonic content effects a proportionate increase in the ballasting reactance exhibited by the equivalent inductance over that exhibited in respect to a wave without such harmonic content. (In the final run state, the harmonic content is minimal.)

In accordance with another aspect of the invention, the transformer has two primary windings, and a separate secondary winding, the primary windings being switched by a pair of transistors operated in push-pull, with control windings being coupled to the transistor input electrodes, and adjusted to terminate conduction prior to full core saturation to avoid stressing the transistors. When the transistors are interconnected to effect self-sustained oscillation, the oscillation frequency changes from pre-ignition to the final run states of the light source. The capacitive means is proportioned to resonate at a harmonic of the oscillations at the pre-ignition frequency to achieve a high ignition voltage. During final run operation, when the resonant effects are unwanted, the shift to the final run frequency produces an added decrease in harmonic content.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings, in which:

FIG. 5A contains the pre-ignition waveforms including the voltage across the lamp, and selected collector and base currents; FIG. 5B contains similar waveforms for early warm-up operation, and FIG. 5C contains similar waveforms for the final run condition.

DESCRIPTION OF PREFERRED EMBODIMENTS

Figure 1:
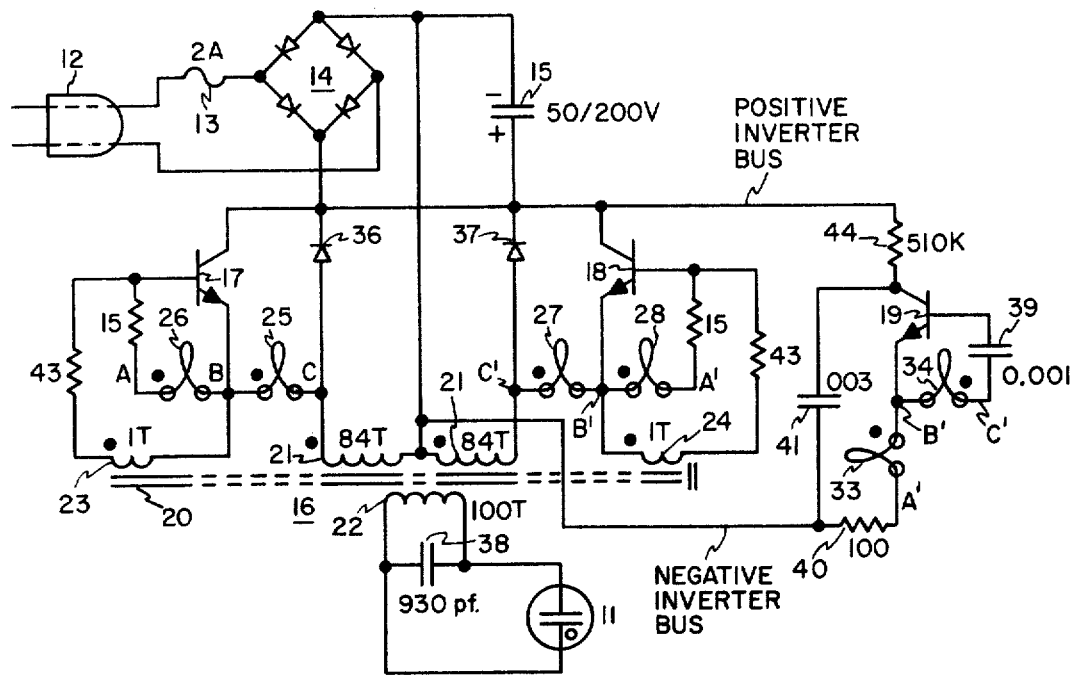
FIG. 1 is an electrical circuit diagram of a power supply for ignition and operation of a gas discharge light source and which comprises a dc to ac inverter.

Referring now to FIG. 1, an ac power supply is shown for igniting and operating a high efficiency gaseous discharge light source 11.

The gaseous discharge light source 11 typically contains an ionizable gas such as argon, mercury in a liquid state (at ambient temperature) and a pair of electrodes between which an arc can be struck. There may also be traces of other materials. On occasion, a starting electrode is also provided, disposed to support a lower voltage arc than would be provided between the principal electrodes. The electrodes, the mercury and argon are sealed within an arc tube, normally of glass or quartz.

Figure 4:
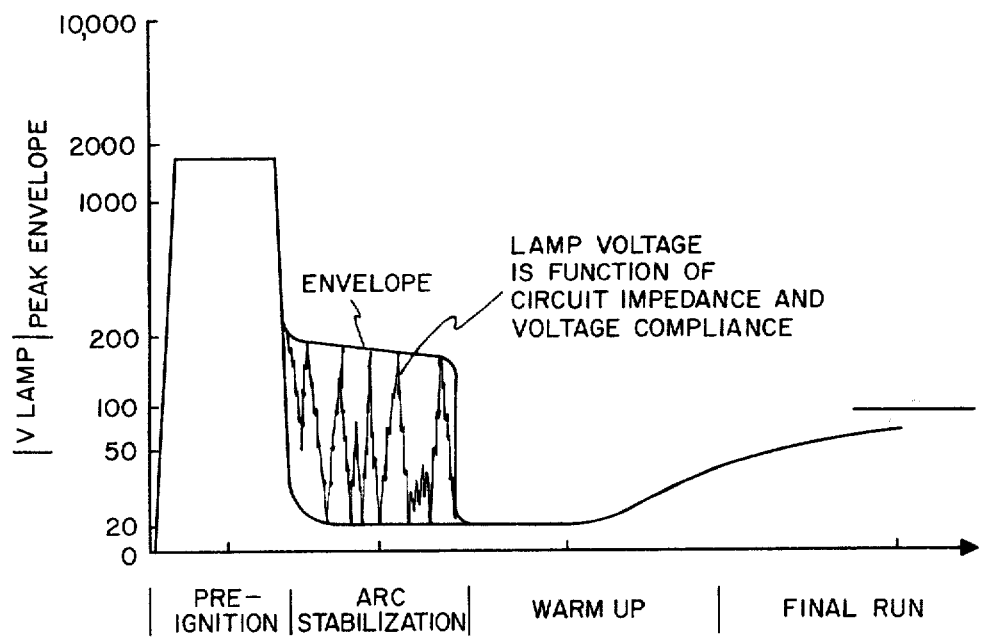
FIG. 4 illustrates the ac power supply output peak envelope voltage through pre-ignition, warm-up and final run operation of the gas discharge light source.

For energization purposes, a gaseous discharge light source may be regarded as exhibiting several states which are partially illustrated in FIG. 4. The gaseous discharge device may be at normal ambient temperature and at a low gas pressure without a discharge, which is characterized as the normal off state. To get an arc to strike in the normal off state, i.e. a cold start, a voltage on the order of a kilovolt, may be required. If the device is deenergized in the course of normal "run" operation, the device will be at an elevated temperature and at a high gas pressure. To re-strike the arc for a "hot restart" the potential required may be in excess of an order of magnitude more than for a cold start (e.g. 10–30 KV) and more time may be required.

There are four states in the normal process of turning on a gaseous discharge light source. Pre-ignition is a period during which a high voltage is applied to cause "breakdown" of the light source. Pre-ignition may be quite short for a cold start and longer for a hot restart. The voltage, which is normally a periodic pulse, may not succeed at the first pulse, or the first pulse may create an arc which dies before the next occurs. In a short time, the arc becomes sustained, signalling the end of the pre-ignition period—but instability remains. At the beginning of the arc stabilization period, the lamp electrodes and the gas filling are cool, the gas pressure is low, and the mercury is unvaporized. The voltage may fall, as illustrated in FIG. 4, by a factor of eight (for the envelope) during arc stabilization, and may be higher or lower than the final run condition. In fact, the arc stabilization period may be characterized as a period in which the arc takes erratically different paths through the gas between different elemental surfaces of the electrodes, and the voltage across the electrodes may jump between a low voltage, e.g. 20–40 volts (peak to peak) and an intermediate voltage, e.g. 200 volts (peak to peak). During arc stabilization, the arc is supported primarily by ionized argon at a low pressure, with the mercury as yet unvaporized and with the electrodes not yet at thermionic emission temperatures. The duration of the arc stabilization state and the arc voltages during that state are a function of both the properties of the light source and the supply circuit impedance and voltage compliance. In certain cases, the erratic arc discharge time may be shortened or substantially suppressed and the arc will quickly transition to its lowest value. When the instability ceases, the warm-up period begins, in which the arc voltage is very low (20-40 volts peak to peak) but steady. In the warm-up period, the power supply must be regulated to avoid too large a current, since an unregulated arc will dissipate excessive power and damage the light source electrodes. The light output remains low in the warm-up period. As the run state is approached, the electrodes begin to achieve thermionic emission, the gas pressure elevates and both the argon and vaporized mercury contribute to the light output. The voltage required to maintain the arc rises (e.g. 90–120 volts peak to peak) and a normal light output is produced. The turn on process may take 40 seconds.

In the event that the voltage is momentarily interrupted during the run state, and the arc goes out, then the hot restart mentioned earlier will be required. Hot restart requires either the elevated voltage mentioned earlier, or some compromise value based on a delay to permit partial cooling, and a consequent partial reduction in internal gas pressure to the point where re-ignition is possible at a more nearly normal ignition voltage. In the present application, the delay may be reduced to 40 seconds as a primary function of the output voltage.

Operating power for a gaseous discharge light source having the properties just described is provided by the power supply illustrated in FIG. 1. The power supply provides ac energy at 20–30 kilohertz with a normal operating potential of 90–120 volts peak to peak. The power supply provides an ignition or pre-ignition voltage of approximately 1600 volts peak to peak.

The power supply has as its principal components a dc power supply designed for connection to a 120 volts 60 hertz ac source, and comprising elements 13, 14 and 15; and a novel inverter for converting electrical energy supplied by the dc power supply to ac for providing the ac ignition and operating potentials for the gaseous discharge light source 11.

The dc power supply is conventional. Energy is supplied from a 120 volt 60 hertz ac source via the plug 12. One input line is fused by the fuse 12, and the two input lines are coupled to the ac terminals of a full wave rectifier bridge 14. The positive output terminal of the bridge is connected to the positive inverter bus, and the negative output terminal of the bridge is connected to the negative inverter bus. The filter capacitor 15 is connected across the output terminals of the rectifier to reduce ac ripple in the dc output before application to the dc to ac inverter.

The dc to ac inverter herein described is a modification of the inverter described in the copending application entitled "A Static Inverter and a Transformer for Use In a Static Inverter" of Messrs. Peil, Schmitz and Harris, Ser. No. 875,337, filed Feb. 6, 1978 and assigned to the present Assignee. The inverter herein described contains measures for turning on a gas discharge light source not disclosed in the cited patent application.

The inverter comprises a power transformer 15, a pair of main switching transistors 17, 18, transistor 19 used to start the inverter, and sundry circuit elements, the combination producing the ac ignition, warm-up, and running voltages for the gaseous discharge light source.

Figure 2:
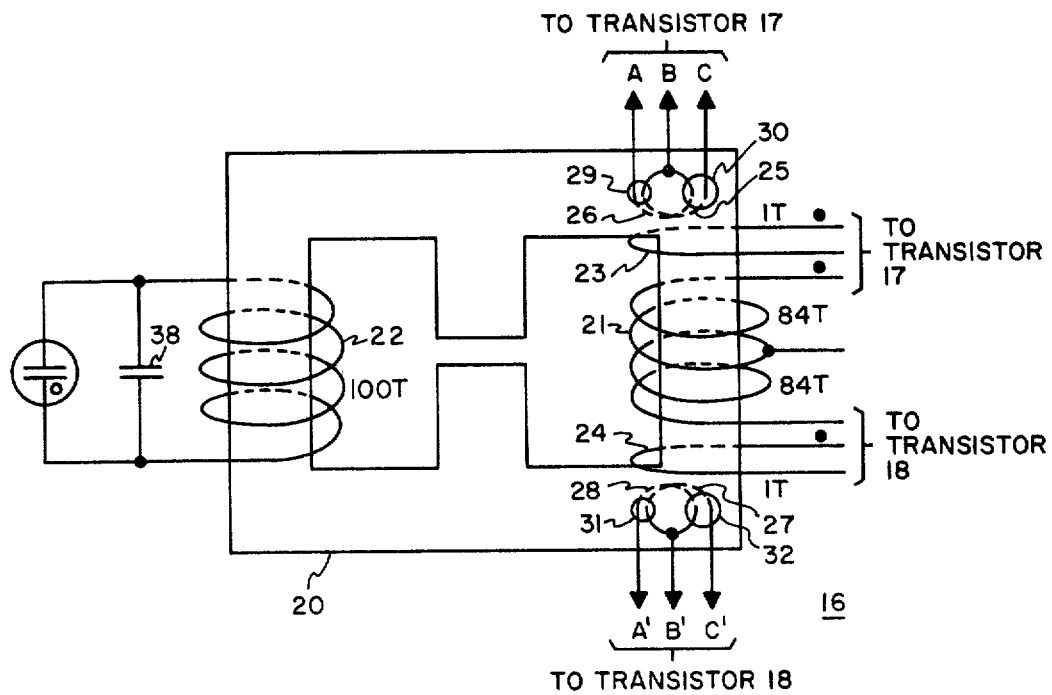
FIG. 2 is a drawing of the transformer used in the inverter, the drawing illustrating the magnetic core and the windings associated with the core.

The power transformer 16 is depicted in part in the electrical circuit diagram of FIG. 1 and in part in the simplified mechanical showing of FIG. 2. The transformer has a ferrite core 20, more exactly illustrated in FIG. 2, normally assembled from two pieces having a controlled leakage inductance, which may be provided by a shunt, and a branched principal flux path partitioned by two pairs of double apertures (29, 30) and (31,32), one pair in the upper right part of the core, and the other pair in the lower right part of the core (using the FIG. 2 orientations). The transformer has a center tapped main primary winding 21, wound on the right leg of the core, a main secondary winding 22, wound on the left leg of the core, this position increasing the leakage inductance, and a pair of regenerative voltage feedback windings 23, 24, both wound on the right leg of the core. The power transformer also has a first pair and a second pair of current feedback windings (25, 26) and (27, 28), each pair associated with a double aperture of the core. The current feedback windings of one aperture pair encircle a common core portion by which they are coupled together while being neutral or uncoupled to the main flux. Under certain magnetization states to be described, the control windings (26, 28) will become coupled to the main flux.

The transformer 16 is connected with the transistors 17 and 18 in an inverter configuration. The voltage feedback windings 23 and 24 are each connected in series with a small resistance across the input junctions of the switching transistors 17 and 18 in a regenerative sense in respect to the primary winding as indicated by the dots. The winding pairs 25, 26 and 27, 28 associated with transistors 17 and 18, respectively, provide current feedback in which the sense is initially regenerative and later degenerative. The primary current feedback windings (25, 27) are connected in series with the respective halves of the center tapped transformer primary (21) between the emitters of the associated power transistors and the negative inverter bus. More particularly, the undotted terminal of the left half of primary power winding 21 (as seen in FIG. 1) is coupled to the negative inverter bus and the dotted terminal is coupled to the undotted terminal of the primary current feedback winding 25. The dotted terminal of the winding 25 is connected to the emitter of transistor 17. Similarly, the dotted terminal of the right half of the primary power winding 21 (as seen in FIG. 1) is coupled to the negative inverter bus and the undotted terminal is coupled to the dotted terminal of the primary current feedback winding 27. The undotted terminal of the winding 27 is connected to the emitter of transistor 18. By this connection, the collector currents of transistors 17 and 18, which pass through the primary power winding halves also pass through the primary current feedback windings 25 and 27, respectively. The secondary current feedback windings 26 and 28, which are inductively coupled to the respective primary windings 25 and 27, are each connected with a series resistance between the input junctions of the transistors 17 and 18, respectively. Letters A, B, C and A', B', C' have been indicated on both FIGS. 1 and 2 to illustrate the physical sense of the connections to the current feedback windings. As indicated, the winding pairs 25, 26 and 27, 28 are connected in a mutually regenerative sense. They are normally independent of the sense of the primary winding (21). The path for primary current is completed through each winding half of primary 21 by connection of the collectors of transistors 17 and 18 to the positive inverter bus. A pair of flyback diodes 36, 37 are provided, each coupled between a collector of a power transistor and an output terminal of the primary winding and each poled to conduct current from the primary winding toward the positive bus. The main secondary winding 22 of the power transformer is connected to the terminals of a resonating capacitor 38, and to the terminals of the gaseous discharge lamp 11.

Once started by means not yet described, the inverter circuit will oscillate under the influence of the voltage and current feedback windings and the flyback diodes. Let us assume that transistor 18 has been conducting with collector current flowing through the right half of primary 21 into the negative inverter bus, and that the current flow is then interrupted by turning off transistor 18. The collapsing field will tend to make a generator of the primary winding. For the right winding half, the undotted terminal becomes negative with respect to the dotted terminal, the latter terminal being coupled to the negative inverter bus and at nominal zero potential. At the same time, the collapsing field will generate a positive potential at the dotted terminal of the left winding half with respect to the center tap. The positive potential induced by the collapsing field will tend to exceed the positive bus potential and cause current to flow into flyback diode 36 toward the positive terminal of the dc supply. Current will also flow through windings 25 and 26 into the base of transistor 17, forward biasing the output junction, and depositing appreciable stored charge in the base region of the transistor 17 to facilitate conduction again. As the induced voltage falls below the positive bias potential, the flyback diode 36 ceases to conduct, and the collector base junction of the transistor 17 loses its forward bias. The transistor voltages are now of the correct polarity to permit conduction in the conventional direction. Initial conduction is facilitated by the charge stored in the base region during the flyback interval just finished. Also during flyback, the voltage on the voltage feedback winding 23, which is proportional to the voltage across the primary winding 21, provides additional forward bias to the input junction of the transistor 17. As the current builds up in transistor 17, substantial current begins to flow from the positive inverter bus into the collector, out the emitter, through the current feedback winding 25, through the left half of the primary winding 21, and into the negative inverter bus. As the current continues to grow, the voltage feedback winding 23, coupled to the primary winding 21 continues to generate a substantial forward bias across the input junction turning the transistor on more strongly.

The turn-on of transistor 17 by the voltage feedback winding 23 is now supplemented by the current feedback windings 25, 26 which initially provide a conduction aiding drive. As transistor conduction increases, and a certain flux level is reached in the flux paths at the apertures 29 and 30, a conduction opposing drive is produced which continues until all stored charge is swept out of the input junction of the transistor 17 and the transistor is turned off completely. This effect establishes a maximum average collector current when the transistor switching rate is constant.

With conduction by transistor 17 suspended, the energy stored in the transformer field collapses and a part is re-injected through flyback diode 37 into the power supply, and a part is used in the manner just discussed to turn on the transistor 18, and initiate conduction in the inverse sense. Throughout the cycle, energy is being continuously dissipated in the light source 11, which is coupled via secondary winding 22 through the core of the transformer to the primary winding. The inverter so far described is like that illustrated in FIG. 5 in the aforementioned patent application Ser. No. 875,337. The transformer may also take a form like that illustrated in FIG. 5 of the copending application Ser. No. 969,381, filed Dec. 14, 1978 entitled "A Transformer for Use in a Static Inverter" of Peil and McFadyen and assigned to the present Assignee.

The starting circuit produces a pulse for starting conduction on one side of the inverter when the power is first applied. The starting circuit consists of the transistor 19, two resistors 44, 40, two capacitors 39, 41 and windings 33 and 34 associated with one aperture pair (31, 32). As a result of the connection of the collector of transistor 19 through resistance 44 to the positive inverter bus, applying power to the inverter applies a potential across the output junction of the transistor 19. A small leakage current flows through this junction, which establishes a charge on the base of the transistor and a positive potential with respect to the emitter. This charge also appears across the capacitor 39, which is coupled between the base and through windings 34 to the emitter. Leakage current produces a forward bias on the input junction which initiates transistor conduction. The emitter current, now started, flows into the dotted terminal of starting winding 33, through resistance 40, toward the negative inverter bus. The emitter current flowing in winding 33 generates a circulating flux which is coupled to control winding 34. Winding 34 is poled for regenerative action and turns on the transistor more strongly. The result is the generation of a pulse in the winding 34 and in secondary winding 28 associated with transistor 18, assuming that 28 is coupled to the same aperture pair. The preferred sense of the starting windings 33, 34 is indicated by the letters A' B', C' applied to the control windings (27, 28). (For clarity, the starting windings are not shown in FIG. 2.) Assuming that the winding 28 is in the same sense to be turned on by an increase in current in winding 33, the transistor 18 is turned on, and the inverter starts to oscillate with transistor 18 conducting first.

The inverter circuit so far described will start itself, and supply the ac power necessary to start and operate a gaseous discharge lamp. Starting the lamp is the subject of the subsequent discussion.

The present supply will produce a voltage of approximately 1600 volts peak to peak for starting the gaseous discharge device. The means by which this high starting voltage is achieved include a transformer design having appreciable leakage inductance and means, normally provided by a supplemental capacitor (e.g. capacitor 38), shunting the secondary winding for causing resonance of the secondary circuit. The light source exhibits a very high, primarily resistive, impedance when off and a relatively low, primarily resistive, impedance when lit, respectively permitting and damping the resonance.

Figure 3A:
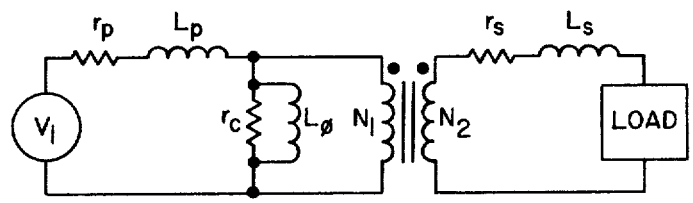
FIGS. 3A to 3E are equivalent circuit representations of the output circuit of the inverter, emphasizing production of the ignition potentials.
Figure 3B:
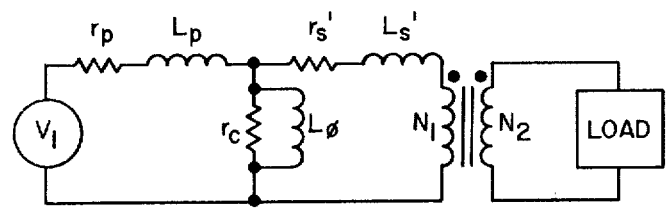
Figure 3C:
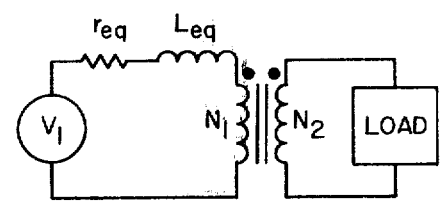
Figure 3D:
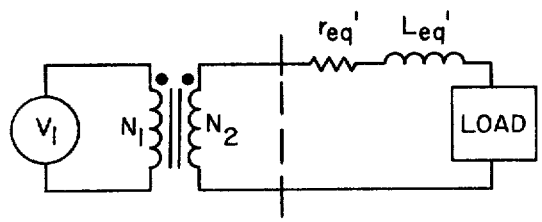
Figure 3E:
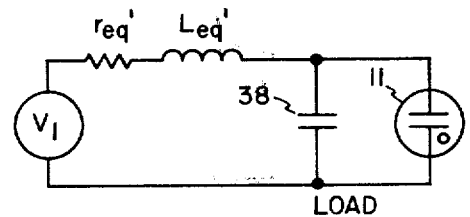

A simplified equivalent circuit of the light source power circuit is that of an inductor (largely made up of leakage inductance), a resistor (largely made up of the generator internal resistance and resistance in the primary circuit) and a capacitor (38); all three being connected in series with the ideal generator as illustrated in FIG. 3E. The light source is connected across the capacitor, and since the latter is shunted by the inductor and the generator in series, the light source may be regarded as connected across a parallel resonant tank circuit. When the light source is off, the loss elements represented by the resistor are small, and the generator is coupled in a series resonant circuit of high Q. Assuming that the inverter frequency, when loaded, is selected to establish series resonance in the load circuit, very high currents will flow in the power circuit. With the inverter operating at the fundamental resonance frequency of the circuit, the currents will be of such intensity, assuming no moderating factor, as to develop an unacceptably high power dissipation in the transformer. At the same time, quite large voltages—not necessarily large enough for ignition, will appear across the lamp terminals.

During ignition, the unacceptably large dissipation developed by resonance at the fundamental can be avoided by selecting a harmonic. By selecting a harmonic, the ignition frequency is increased in multiples of the fundamental, and the reactance of the inductor is made proportionately higher. Assuming a constant volt time area input, and a constant Q, the inductor produces a linear increase in output voltage for each increase in frequency. Thus, if resonance at the fundamental produces 1 unit of output voltage, resonance at the second harmonic will produce 2 units, the third harmonic 3 units, the fourth 4 units, the fifth 5 units, etc. At harmonics above 120 KHz increasing losses in the transformer may reduce the Q, and reduce the progressive increases in voltage. At the same time, assuming equal volt time area inputs, the dissipation in the windings and core will fall in a roughly asymptotic function from a very large value near the fundamental to a slowly decreasing value at the fifth harmonic. Later, as the absolute frequency increases and core losses rise, the dissipation will again increase.

The foregoing discussion is premised upon a constant volt time area for each of the harmonics in the inverter output waveform. In fact, the present inverter produces relatively weak even harmonics, but relatively strong odd harmonics characteristic of a square wave. The third, fifth and seventh are all present. Dependent on the ferrite material, all are potentially useful for ignition. Using lower frequency ferrites, either the third ($3 \times 22 = 66$ KHz) or the fifth ($5 \times 22 = 110$ KHz) harmonic is acceptable. Assuming that the circuit is tuned to resonate at the fifth harmonic, the amplitude of the voltage swings is approximately 1600 volts peak to peak, an amplitude appropriate for igniting a particular gaseous discharge lamp. One may of course adjust the pre-ignition output voltage by turns selection in accordance with requirements of a particular light source.

Once the light source is ignited and draws appreciable current, the Q of the series resonant generating circuit, and the Q of the parallel resonant load circuit, falls primarily as a result of the change in impedance of the load. In addition, the inverter frequency, which runs at 20-22 kilohertz when unloaded, increases to 27 KHz when loaded, and shifts the operating frequency of the subharmonic off the frequency to which the output circuit is tuned. Due primarily to the loading effect of the ignited lamp, however, the resonant swings disappear and the voltage appearing at the light source terminals falls to the lower 90-120 volt peak to peak desired for normal operation of the light source. The equivalent inductor acts as a ballast to establish the desired current levels in the light source.

The simplified equivalent circuit for the load circuit illustrated in FIG. 3E may be derived from the more exact equivalent circuit illustrated in FIG. 3A. The equivalent generator producing an ac output $v_1$ is coupled through an input network to the primary of an ideal transformer having $N_1$ primary turns and $N_2$ secondary turns, and the secondary is coupled through an output network to the load. The input network is a four element network having two serial elements consisting of the switching circuit losses and the primary winding resistance, both represented by resistance $r_p$, in series with the primary leakage inductance ($L_p$). The input network has two shunt elements consisting of the core loss resistance ($r_c$) and the magnetizing inductance $L_\phi$. The output network consists of two serial elements consisting of the secondary winding resistance $r_s$ and the secondary leakage inductance $L_s$. If the secondary winding resistance $r_s$ and the secondary leakage inductance $L_s$ are transferred to a position ahead of the ideal transformer, as illustrated in 3B, they are transformed to the primed quantities $r_s'$ and $L_s'$, respectively, where $$r_s' = r_s \left(\frac{N_1}{N_2}\right)^2 \quad L_s' = L_s \left(\frac{N_1}{N_2}\right)^2 \tag{1}$$

With the circuit so arranged, the equivalent impedance (Zeq.) at the primary of $N_1$, and assuming a short circuit across the generator terminals, may be expressed as follows:

$$Z_{eq.} = \frac{1}{\frac{1}{r_c} + \frac{1}{j\omega L_\phi} + \frac{1}{(r_p + j\omega L_p)}} + r_s' + j\omega L_s' \tag{2}$$

Expression (2) states the equivalent impedance comprising the three shunt elements ($r_c$; $j\omega L_\phi$; $r_p+j\omega L_p$) and two serial elements $r_s'$ and $j\omega L_s'$ of the equivalent circuit. Simplifying:

$$Z_{eq.} = \frac{(j\omega L_\phi)(r_p + j\omega L_p)}{\frac{1}{r_c}(j\omega L_\phi)(r_p + j\omega L_p) + (r_p + j\omega L_p) + (j\omega L_\phi)} + r_s' + j\omega L_s' \tag{3}$$

If one assumes that core losses are negligible ($r_c = \infty$), the equivalent impedance may be further simplified $$Z_{eq.} = \frac{\omega_{rp}^2 [L_\phi(L_p + L_\phi) - L_p L_\phi]}{r_p^2 + \omega^2(L_p + L_\phi)^2} + j\omega L_\phi \frac{[r_p^2 + \omega^2 L_p(L_p + L_\phi)]}{r_p^2 + \omega^2(L_p + L_\phi)^2} + r_s' + j\omega L_s' \tag{4}$$

Separating out the real and imaginary parts of the equivalent impedance:

$$r_{eq.} = \frac{r_p^2 L_\phi^2}{r_p^2 + \omega^2(L_p + L_\phi)^2} + r_s' \tag{5}$$

$$L_{eq.} = \frac{L_\phi [r_p^2 + \omega^2 L_p(L_p + L_\phi)]}{r_p^2 + \omega^2(L_p + L_\phi)^2} + L_s' \tag{6}$$

FIG. 3C is an equivalent circuit representation of expressions (4), (5) and (6).

If it is desired to absorb the ideal transformer into the ideal generator, the equivalent terms $r_{eq.}$ must first be transferred to the secondary side of the ideal transformer. The transformed equivalent terms then become $$r'_{eq.} = \frac{\left(\frac{N_2}{N_1}\right)^2 \omega^2 r_p L_\phi^2}{r_p^2 + \omega^2(L_p + L_\phi)^2} + r_s \tag{7}$$

$$L'_{eq.} = \frac{\left(\frac{N_2}{N_1}\right)^2 L_\phi[r_p^2 + \omega^2 L_p(L_p + L_\phi)]}{r_p^2 + \omega^2(L_p + L_\phi)^2} + L_s \tag{8}$$

Expressions (7) and (8) correspond to the equivalent circuit of FIG. 3D.

Finally, if the ideal transformer is absorbed into the ideal generator, the generator output must also be scaled, and becomes $V'_1$ instead of $V_1$, where $$V'_1 = \left(\frac{N_2}{N_1}\right) V_1 \tag{9}$$

While expressions (7), (8) and (9) justify the simple equivalent circuit representation of FIG. 3E, the contents of the resistance term ($r'_{eq.}$) and equivalent inductance term ($L'_{eq.}$) are complicated. In practice, however, the inductance term predominates in setting up a load line for the lamp and changes little with varying frequencies (i.e. $L_{eq.}$ is constant).

The preferred practice of fabricating the transformer is to wind the primary winding halves in alternate layers on the same bobbin for application to one leg of the core while secondary winding 22 is wound on a separate bobbin for application to a different leg of the core. This allows maximum coupling between primary winding halves which lessens the voltage transient stresses on the transistors. The construction also aids in establishing the conditions for commutation under load in providing an efficient side to side exchange of energy during the turn off interval. The loose coupling between primary and secondary aids in ballasting the lamp during warm-up and final run operations, compensating for the effects of both line and load variations. The use of an inductive ballast produces regulative action without the dissipation of resistive ballasting elements and is thus essential in a high efficiency application.

While a core shunt has been used to provide leakage inductance in the present transformer design, adequate leakage inductance may be available by assembling the primary and secondary windings on remote legs of the core. An apparent inductance of several tens of millihenries is satisfactory for both power stabilization in warm-up, when the voltage drop is a minimum, and for generating the high voltage inductive surges for igniting the lamp. A suitable ferrite material for the core (1F-30) is a medium frequency ferrite (25 KHz) material (3C-8 ferroxcube) having cross sections of approximately 0.06 sq. cms, and an air gap in the third leg of 10 to 50 mils for use at 30 watt power levels.

The present commutation arrangement also permits very efficient operation. The arrangement combines a transformer using a ferrite core with switching transistors for "run" operation at from 20 KHz-30 KHz. The current feedback winding pairs disposed in the double apertures, preclude hard saturation of the core, preclude the resultant stressing of the transistor, and minimize both core loss and transistor dissipation. As a result, the arrangement may readily operate with losses under 10%. With low losses, one may reduce the core sizes, which are a substantial element of cost, to a minimum compatible with tolerable ballasting in the operating mode of the light source. Assuming "small" cores selected for normal operation, the ignition mode need not require a greater dissipation capability. Of course, one must avoid the possibility that a starting failure, which prolongs the starting cycle, could gradually heat the transformer to destructive temperatures. The present invention provides a means for effectively increasing the voltage available for ignition while not exceeding that dissipation requirement for normal operation. Thus, by selecting the third or fifth harmonic, which are below the frequencies at which core losses begin to increase for available low cost ferrites, one may get very large voltage surges with less heating than required during normal operation. (The special limitations on operating frequency imposed by the lamp itself at final run do not apply to the ignition process.)

The circuit has a very large voltage compliance, by which one means that there is a large voltage range available for restriking or maintaining the arc. This quality is of concern during the pre-ignition and arc stabilization periods. In the present circuit, up to 1600 volts peak to peak is available to restrike the arc and 200 volts peak to peak is available during the more "loaded" arc stabilization period. Should the loading disappear, as by momentary extinction of the lamp during the arc stabilization period, the full 1600 volts peak to peak is instantly available.

The arrangement permits control of the power available to the light source during each of the several states of the lamp. The effective circuit impedance governs the power available to the lamp during each of these states. The impedance also governs the reflection of load characteristics back to the inverter elements. During arc stabilization, for instance, an extinction of the arc producing a sharp increase in load impedance allows the circuit to jump back into resonance, and to generate the elevated restrike potential. Later, in the warm-up period, the fundamental shifts upward in frequency moving farther away from resonance, and lowering the circuit "Q". This effect continues until the final run conditions are reached. The lower "Q" condition enables matching of the power source to the changing lamp voltage as the lamp ages. Had a higher "Q" continued into the run mode, more constant light source parameters would have been required for reliable operation.

Frequency slewing supplements the "Q" reduction due to a reduced load impedance in keeping load currents at reasonable values. The frequency slewing is partly attributable to changing current levels which alter the winding inductance due to core non-linearity and partly due to the change in the transistor conduction periods between initial conduction and base drive reversal. The composite effect is one in which the frequency increases from pre-ignition at 22 KHz, to 24 KHz during warm-up, and to 27 KHz during the final run condition. Thus, the operating frequency is moved successively further away from the fundamental of the harmonic to which the resonant circuit is tuned, leading to a greater suppression of resonant effects during run operation and a further desirable reduction in "Q" during the run mode.

The characteristics of the overall design allow one to optimize all four lamp states substantially independently. Final run ballasting and efficiency are optimized first by placing the frequency of operation within the lamp frequency window and adjusting the geometry of the shunt on the core for a desired ballast inductance ($L_{eq}$). The starting voltage is next optimized taking into account the no-load frequency, and properly selecting the load capacitor (38) for resonance at the appropriate harmonic. These are selected to give 1600 V at the fifth harmonic resonance (for example). Arc stabilization performance is beneficially affected by the harmonic content still present in the drive voltage. Lastly, when a load line has been set for final run operation, experience has shown that over current problems in early warm-up are also avoided.

The ballast circuit exhibits reduced current and power levels during the starting states. This is in part due to the regulating effect on the base drive circuitry, which sets an upper limit to the current supplied to the transformer primary, and in part due to the harmonic content of the supply waveform which multiplies the effective inductive reactance of the ballast.

In pre-ignition, the total current and total power dissipation are low. The power in the inverter output is predominantly not at the fundamental but at the harmonic of the inverter frequency to which the secondary is tuned (i.e., the third or fifth), at which the impedance minimum occurs. The power dissipation at the harmonic is low due to the high inductive reactance of the windings and the high load impedance.

In the arc stabilization period, the total current and total power is higher than during pre-ignition. The power in the inverter output continues predominantly at the harmonic of the inverter frequency, but the power dissipation is low due to the high inductive reactance of the windings and the high load impedance.

During warm-up, the load resistance falls sharply, demanding more current. A first factor in keeping the power below reasonable limits during the warm-up state is the current limiting effect of the base drive circuitry. When the flux reaches a pre-determined maximum value in each conduction period corresponding to a maximum collector current, the transistor drive is turned off and then reversed, terminating the conduction period. With the switching rate kept relatively constant, the maximum average current is kept equally constant.

A second factor in holding power consumption low during warm-up is the continued presence of substantial harmonic content which acts through the equivalent inductance ($L_{eq}$). The composite effect is a maximum current limit set by the base drive circuitry, which limit is reduced in proportion to the harmonic content of the waveform, and in proportion to the equivalent inductance establishing the load line. The load voltage during this period is very low due to the minimum lamp resistance, the circuit reactance is still quite high, and the transistor current high-but limited. These factors keep both total input power and the power applied to the lamp substantially less than for final run operation.

During final run operation, the highest power levels occur. In the final run state, the lamp is at a higher impedance, higher voltage state. The harmonic content is now reduced (see FIGS. 5A, 5B and 5C) to a small percentage of the fundamental, being even further reduced by the final frequency shift away from the resonance point, and the natural load line of the equivalent inductance applies. The operative load line forces a substantial reduction in current below that set by the base drive circuitry, allowing the power to reach the designed maximum value for final run operation.

The current required to maintain a stable arc during the arc stabilization period has been found for typical lamp samples to be reduced by as much as one half for an ignition circuit as herein described, having substantial harmonic content in the frequency range of 50-100 KHz, over a comparable circuit using 20-30 KHz. As earlier noted, the present arrangement makes no power demand on the ballast above that required for the normal run operation. Power demands (rms ac line) during ignition and early warm-up are typically 5-10 watts instead of the 20 watts or more typical of other starting configurations for the same light source. No warm-up time penalty is paid for using the present harmonic ignition since the rms power dissipated in the inverter and the secondary circuit are greatly reduced while that applied to the lamp remains substantially the same.

In the complete circuit herein described, power dissipation is controlled at each state of the lamp, holding the dissipation in the starting states to less than the final run state of the lamp. A consequence of power conservation, in addition to lamp protection, is that the core size of the transformer may be set by the requirement for the final run mode, and need not be expanded for hot restart, pre-ignition or warm-up. With the use of harmonic operation, the development of the high voltage ignition peak is also achieved without requiring core size growth beyond that needed for the run mode. Thus, the transformer operates as a variable ratio device having a variable output range of almost two orders of magnitude while still providing adequate power for each lamp state.

What is claimed as new and desired to be secured by Letters Patent of the United States is:

1. A dc to ac inverter with power limiting for operation of a gaseous discharge light source through pre-ignition, arc stabilization, warm-up, and final run states comprising:
   A. input terminals for connection to a dc electrical source,
   B. output terminals for connection to a gas discharge light source,
   C. a transformer comprising:
      (1) a core of substantially linear magnetic material for main flux pursuing a main magnetic path, aperture means in a localized region of said core defining a second magnetic path,
      (2) a main primary winding and a main secondary winding associated with said main magnetic path, said main windings being loosely coupled to provide an equivalent output inductance having significant ballasting effect,
      (3) magnetic state responsive control winding means comprising a primary and a secondary control winding traversing said aperture means, said secondary control winding being coupled through said second magnetic path to said primary control winding, substantially uncoupled to main flux in the absence of saturation effects, and producing an output which reverses in sense at a predetermined flux level,
   D. transistor switching means serially coupled with said main primary winding across said input terminals for producing a periodic output in said main output winding with substantial harmonic content, and responsive to said control winding to limit the average current supplied to said light source, said current limiting effect in combination with said equivalent output inductance precluding excessive power dissipation during warm-up and final run states of the lamp, and
   E. capacitive means connected in shunt with said output winding and across said output terminals to resonate with said equivalent inductance at a prescribed harmonic to produce the enhanced output voltage required for pre-ignition and arc stabilization.

2. A dc to ac inverter as set forth in claim 1 wherein
   A. said transistor switching means is a pair of transistors, and
   B. said main primary winding comprises a first winding associated with a first of said transistors and a second winding associated with a second of said transistors, the combination facilitating push-pull transistor operation and providing substantial odd harmonic content which is maximum during pre-ignition (when the impedance of said light source is maximum) and which decreases successively through arc stabilization, warm-up and final run states of said light source.

3. A dc to ac inverter as set forth in claim 2 wherein the frequency of said inverter is minimum during pre-ignition and increases successively through arc stabilization, warm-up and final run states of said light source; said capacitive means being selected to resonate at an odd harmonic of the pre-ignition frequency to achieve an output voltage which is maximum during pre-ignition due to Q enhancement and which decreases successively through said succeeding states of said light source.

4. A dc to ac inverter as set forth in claim 3 wherein said core consists of consecutive core elements forming a closed magnetic path, said main primary winding being located on a first core element and said main secondary winding being located on a second core element remote from said first core element to achieve a substantial equivalent leakage inductance.

5. A dc to ac inverter as set forth in claim 4 wherein said core has in addition thereto a magnetic shunt to said closed magnetic path for diverting magnetic flux developed in said first core element from said second core element to achieve a substantial equivalent leakage inductance.

6. A dc to ac inverter as set forth in claim 5 wherein
   A. said core has a first aperture means in a first localized region and a second aperture means in a second localized region, each aperture means comprising, respectively, a first and a second aperture pair; and
   B. wherein said control winding means comprises
      (1) a first primary and a first secondary control winding wound through both apertures of said first aperture pair to provide current transformer action for said first transistor; and
      (2) a second primary and a second secondary control winding wound through both apertures of said second aperture pair, to provide current transformer action for said second transistor.

* * * * *